United States Patent
Torres et al.

(10) Patent No.: US 7,812,492 B2
(45) Date of Patent: Oct. 12, 2010

(54) MOTOR DRIVE ASSEMBLY

(75) Inventors: Jean-Marc Torres, Bolton (CA); Leslie Joseph Marentette, Newmarket (CA); Lian Sheng Zhang, Brampton (CA); Stephen James Caron, Aurora (CA); Christopher Michael Mitchell, Uxbridge (CA)

(73) Assignee: Magna Closures Inc., Newmarket (CA)

( * ) Notice: Subject to any disclaimer, the term of this patent is extended or adjusted under 35 U.S.C. 154(b) by 0 days.

(21) Appl. No.: 11/917,047

(22) PCT Filed: May 18, 2006

(86) PCT No.: PCT/CA2006/000809

§ 371 (c)(1),
(2), (4) Date: May 2, 2008

(87) PCT Pub. No.: WO2006/130954

PCT Pub. Date: Dec. 14, 2006

(65) Prior Publication Data

US 2008/0203835 A1    Aug. 28, 2008

(51) Int. Cl.
*H02K 23/66* (2006.01)
*H02K 5/00* (2006.01)

(52) U.S. Cl. .......................... 310/89; 310/83; 310/68 B

(58) Field of Classification Search ............... 310/67 R, 310/89, 68 B, 83, 74
See application file for complete search history.

(56) References Cited

U.S. PATENT DOCUMENTS

| | | | |
|---|---|---|---|
| 5,245,258 A | 9/1993 | Becker | |
| 6,107,713 A | 8/2000 | Hulsmann et al. | |
| 6,191,512 B1* | 2/2001 | Lekeux et al. | 310/89 |
| 6,317,332 B1* | 11/2001 | Weber et al. | 361/760 |
| 6,555,978 B1 | 4/2003 | Castellon | |
| 6,707,183 B2 | 3/2004 | Breynaert et al. | |
| 6,742,413 B2* | 6/2004 | Schwital et al. | 74/606 R |
| 6,756,754 B2 | 6/2004 | Bent et al. | |
| 6,889,578 B2 | 5/2005 | Spaziani et al. | |
| 6,903,473 B2 | 6/2005 | Matsuyama et al. | |
| 6,924,614 B2 | 8/2005 | Onozawa et al. | |
| 6,952,087 B2 | 10/2005 | Lamm | |
| 2003/0151382 A1 | 8/2003 | Daniels et al. | |
| 2003/0160526 A1 | 8/2003 | Becker et al. | |
| 2004/0061462 A1 | 4/2004 | Bent et al. | |
| 2004/0206194 A1 | 10/2004 | Proano | |
| 2005/0179409 A1 | 8/2005 | Honma et al. | |

FOREIGN PATENT DOCUMENTS

EP   1 533 885   5/2005

* cited by examiner

*Primary Examiner*—Quyen Leung
*Assistant Examiner*—Leda Pham
(74) *Attorney, Agent, or Firm*—Alex Porat; Magna International Inc.

(57) ABSTRACT

An electronic control unit (ECU) for a motor is mounted to a drum housing or the like in a plane parallel to the plane defined by the surface of the drum housing on which the motor is mounted. The housing for the motor includes an aperture window. Power contacts from the ECU mate with contacts from the motor through the window. Hall-effect sensors attached to the ECU can extend through the aperture to be proximate a ring magnet attached to the armature shaft of the motor. Alternatively, flux guides attached to the drum housing to transmit magnetic flux information from the motor to the Hall-effect sensors. Alternatively, optical sensors attached to the ECU can detect rotations of a reflector ring attached to the armature shaft through the window.

13 Claims, 7 Drawing Sheets

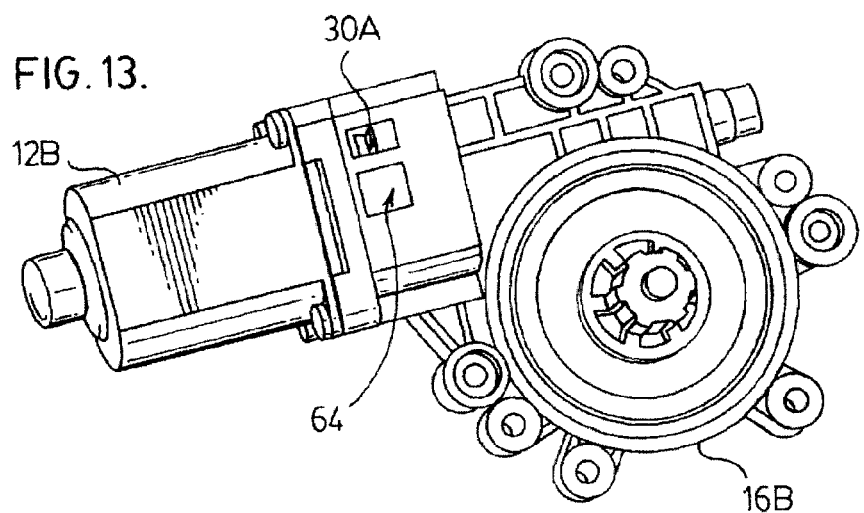
FIG. 13.
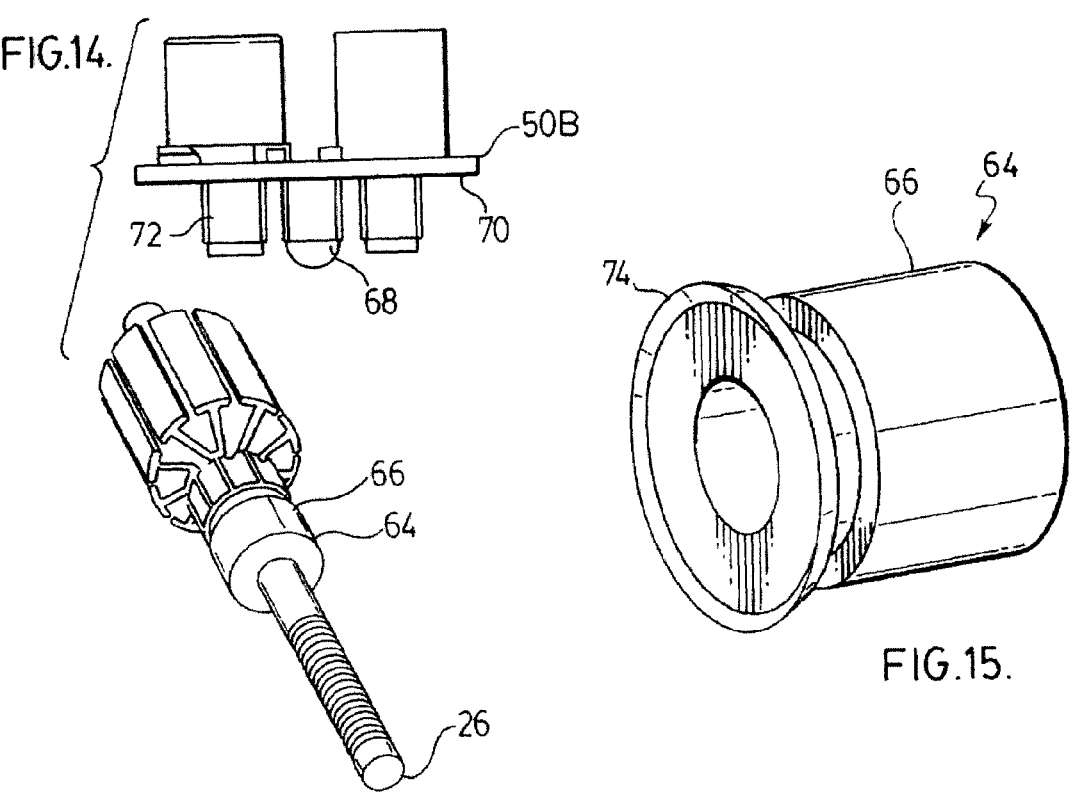
FIG. 14.
FIG. 15.

MOTOR DRIVE ASSEMBLY

FIELD OF THE INVENTION

The present invention relates to electronic control devices for electric motors adapted for automotive applications. More specifically, the present invention relates to how the device is connected to the motor and how the device measures the operating state of the motor.

BACKGROUND OF THE INVENTION

Modern vehicles include multiple powered systems, such as power windows and sunroofs. Each of these systems use a DC motor to move a closure panel between an open and a closed position. Anti-pinching technology has become an attractive and often necessary safety feature that adds to the complexity of these systems. Information such as speed and direction needs to be transmitted from the motor to an electronic control unit (ECU) that can interpret this data to detect if a pinching condition has occurred and to properly regulate the motor. Typically, Hall-effect sensors are used to detect changes in motor speed indicating a pinch condition.

In order to be effective, the Hall-effect sensors typically must be near a ring magnet mounted on the armature on the motor, which can be problematic due to the placement of the ECU. US patent application 2004/0206194 to Proano teaches the use of field concentrators inside the motor to direct magnetic flux to magnetic field sensors located outside of the motor. U.S. Pat. No. 6,707,183 to Brenaert et al. teaches an ECU that is mounted directly to the motor. A flux concentrator is placed between a magnetic field sensor mounted to the ECU and a magnet on the motor.

The ECU is typically specific for each vehicle and must not interfere with the clearance requirements of the vendor. Connections between the ECU and the motor should be watertight and resistant to dust and debris. Ideally, the connection to the ECU should also provide power to the motor. It remains desirable to provide an improved drive assembly that includes an ECU connected to the motor.

SUMMARY OF THE INVENTION

According to a first embodiment of the invention there is provided a motor drive assembly, comprising:

a mounting structure;

an electric motor enclosed in a housing and mounted to the mounting structure on a first plane;

an electronic control unit for controlling energization of the electric motor mounted to the mounting structure on a second plane; and wherein the first plane and the second plane are substantially parallel.

BRIEF DESCRIPTION OF THE DRAWINGS

Embodiments of the invention will now be described with regards to the following illustrations, where:

FIG. 13 is a perspective view of a motor and housing according to a third embodiment of the invention;

FIG. 14 is a stylized view of an optical sensor on the ECU interoperating with a reflector ring mounted to the armature shaft of the motor shown in FIG. 13; and FIG. 15 is a perspective view of the reflector ring shown in FIG. 14.

DETAILED DESCRIPTION OF THE INVENTION

Figure 1:
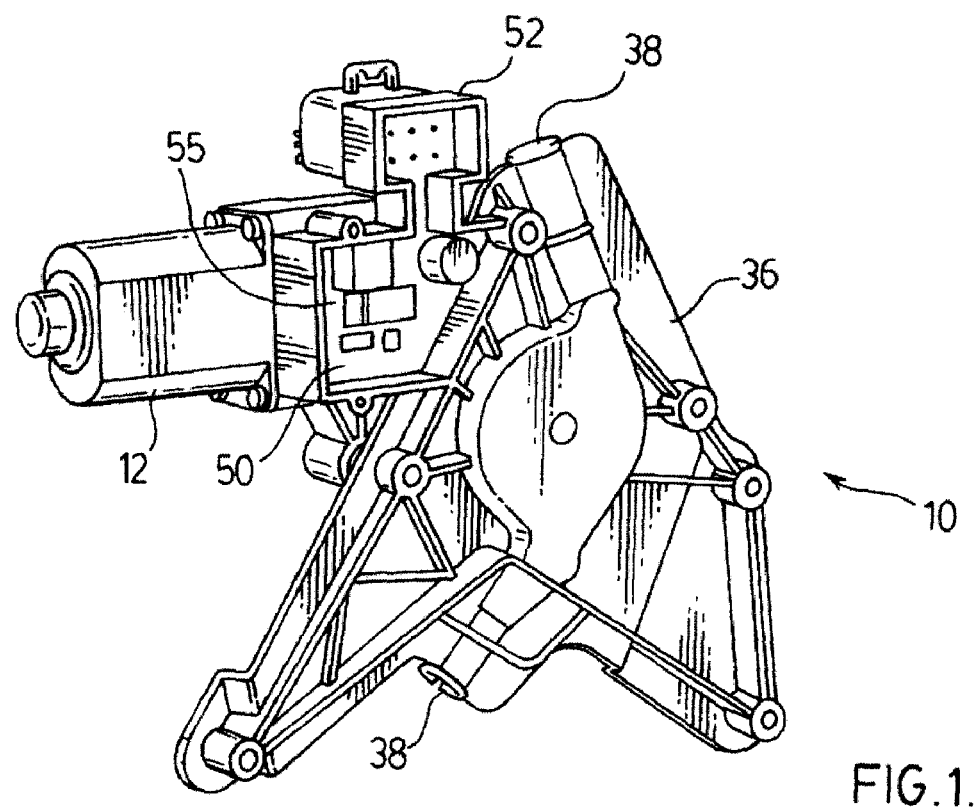
FIGS. 1 and 2 are perspective views of a motor drive assembly from opposing sides in accordance with a first embodiment of the invention.
Figure 2:
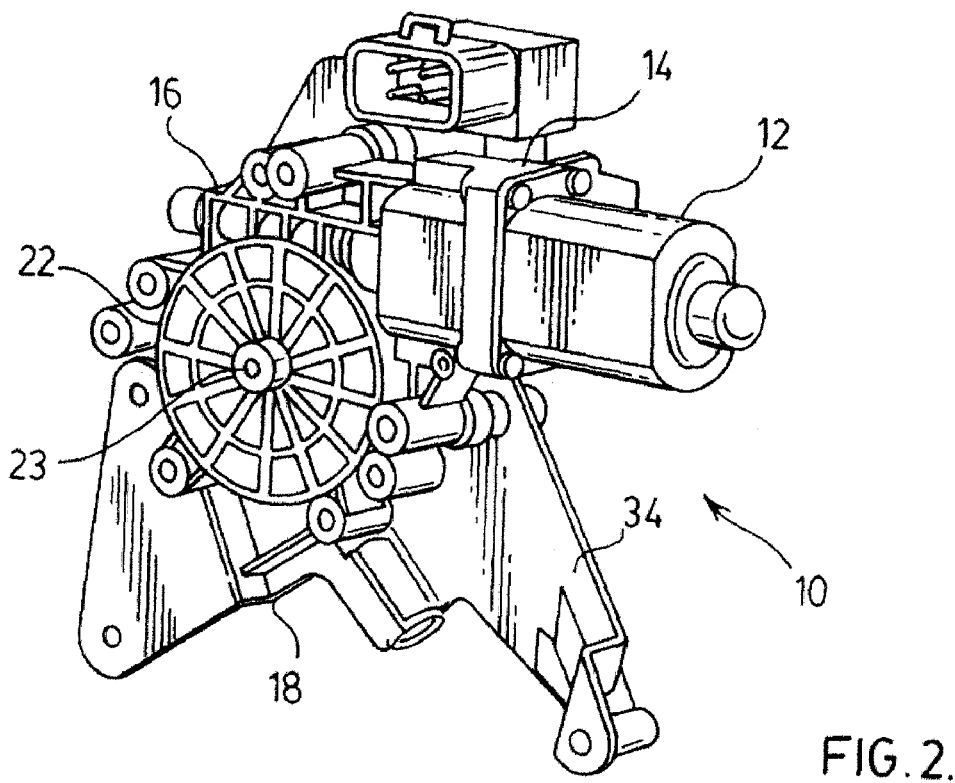
Figure 3:
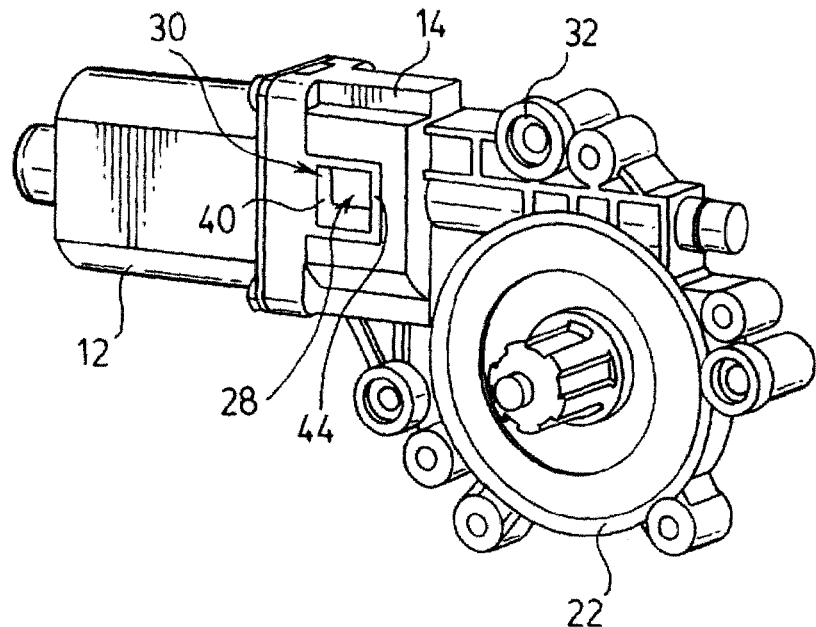
FIG. 3 is a perspective view of a housing for the motor drive assembly shown in FIG. 1.
Figure 7:
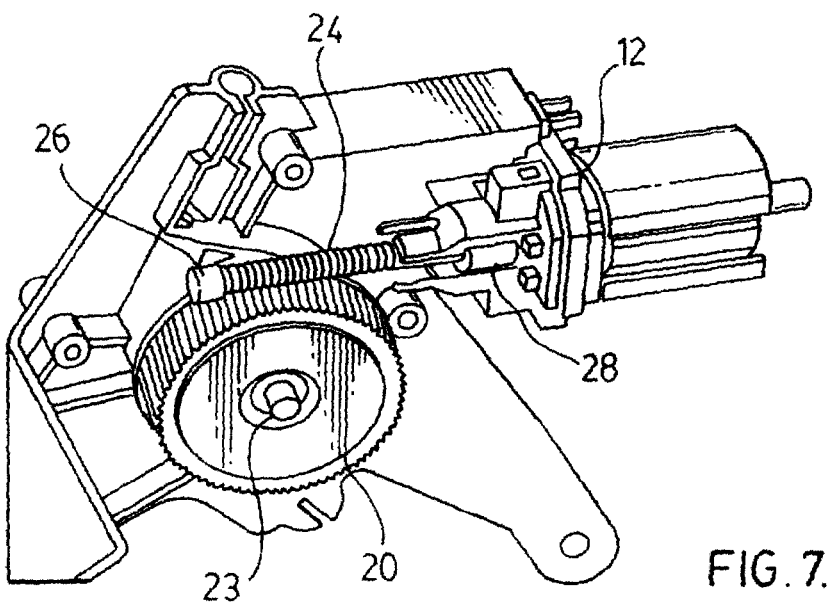
FIG. 7 is a perspective view of the motor drive assembly shown in FIG. 1 with the housing and motor casing removed.

Referring now to FIGS. 1 and 2, a motor assembly 10 is shown. Motor assembly 10 adapted to drive a window regulator (not shown). Motor assembly 10 includes a conventional DC motor 12 that is mounted within a motor chamber 14 on a housing 16, which in turn is mounted to another vehicle structure, such as a drum housing 18. Although drum housing 18 is illustrated as a separate component that can be attached to a door module, it will be understood that drum housing 18 could be formed as an integral part of a carrier panel or other door component. A gear 20 (FIG. 7) is rotatably mounted to housing 16 within a gear chamber area 22 around an axis 23. A worm 24 on an armature shaft 26 extending from DC motor 12 meshes with the teeth on gear 20 and is operable to reversibly drive the gear. As can clearly be seen in FIG. 3, a multi-polar ring magnet 28 is coaxially mounted around a portion of armature shaft 26 located within motor chamber 14. Two conventional motor contacts 30 extend from DC motor 12 into motor chamber 14. A plurality of mounting holes 32 are provided in the housing 16 to secure it to drum housing 18 using conventional fasteners.

Figure 4:
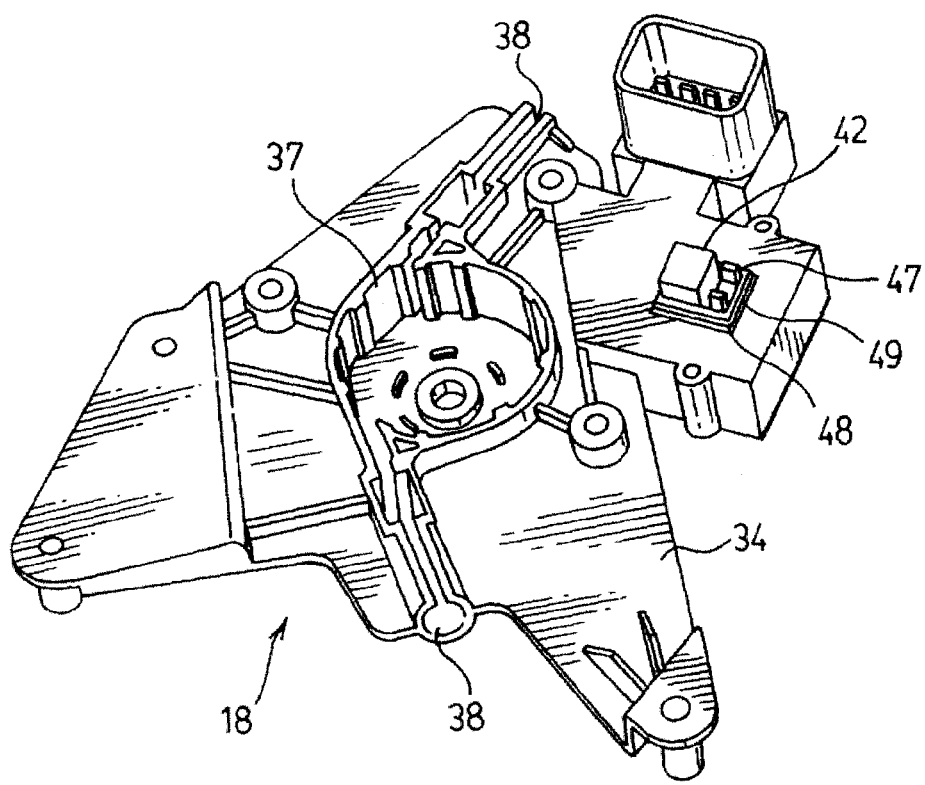
FIGS. 4 and 5 are perspective views of a drum housing from opposing sides for the motor drive assembly shown in FIG. 1.
Figure 5:
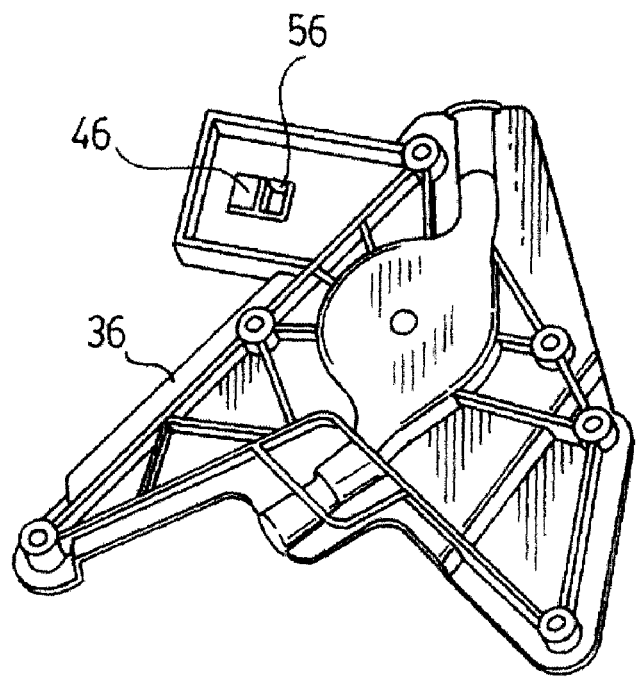

Referring now to FIGS. 4 and 5, drum housing 18 provides an interior side 34 that faces towards housing 16 and an exterior side 36 that faces away from housing 16. Interior side 34 provides a drum chamber 37 that is in communication with gear chamber area 22 on the housing 16 and is operable to retain a cable drum (not shown) that is rotatably driven by gear 20 around common axis 23. Cable channels 38 are provided within drum housing 18 providing communication from drum chamber 37 to the exterior of drum housing 18 in order to provide passage for cables (not shown) threaded around the drum.

Figure 8:
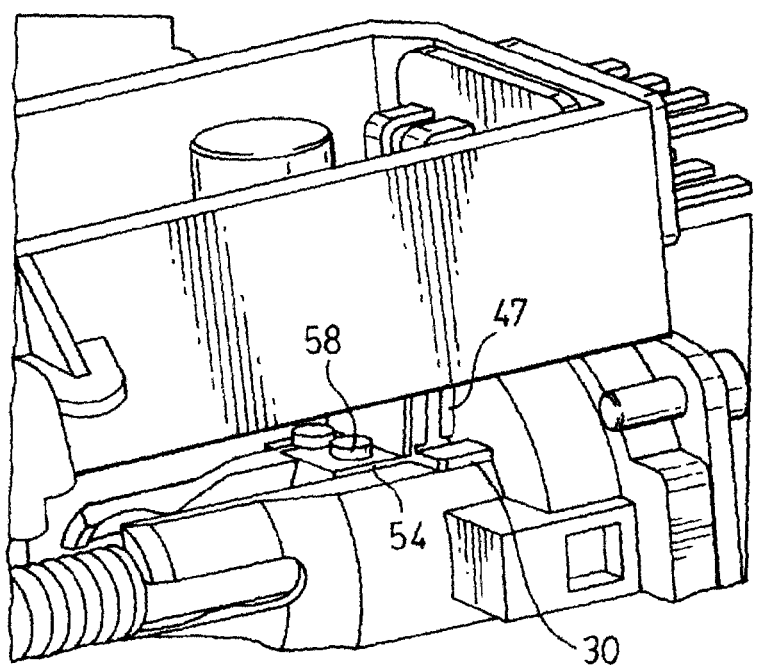
FIG. 8 is a perspective view of the motor drive assembly shown in FIG. 7 with a protrusion on the drum housing removed.
Figure 9:
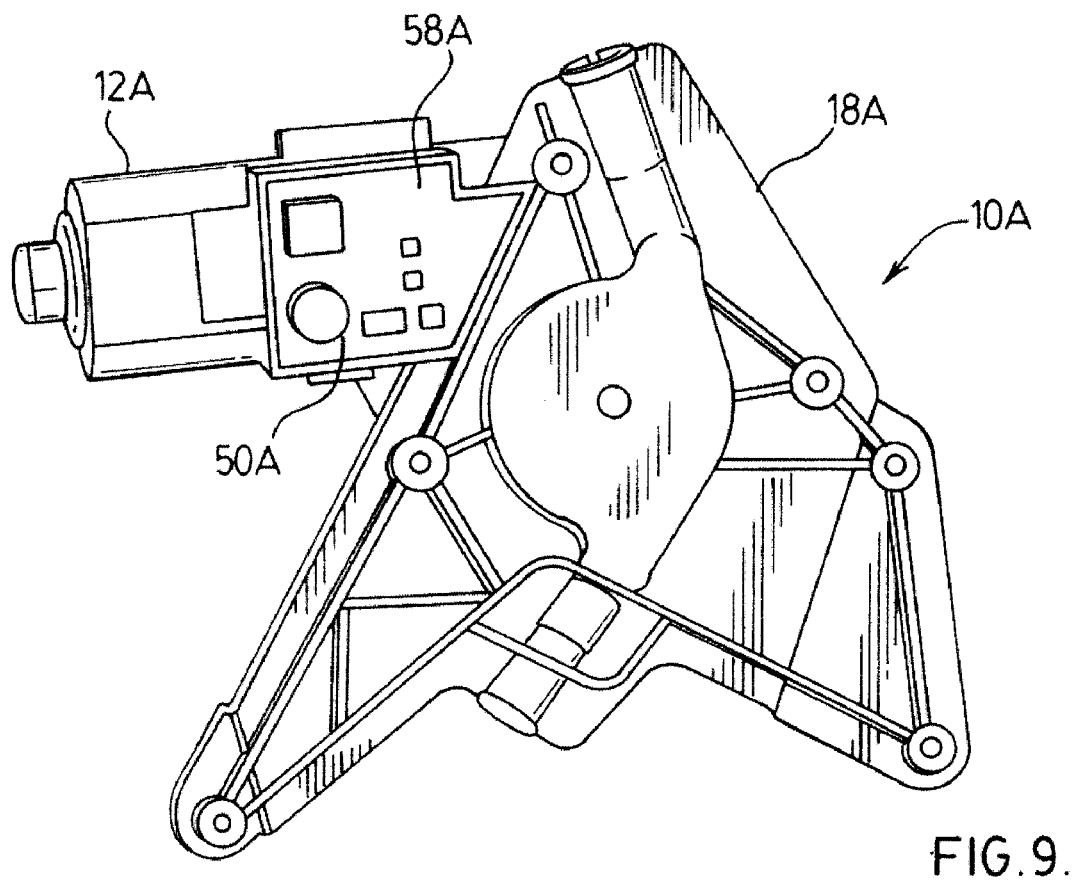
FIG. 9 is a perspective view of a motor drive assembly according to a second embodiment of the invention.
Figure 10:
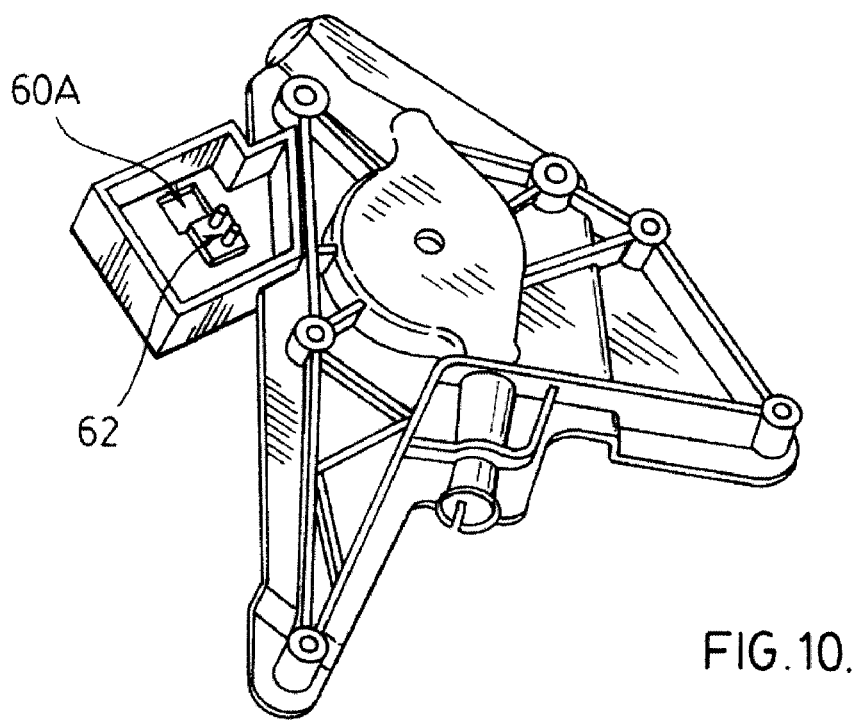
FIG. 10 is a perspective view of a drum housing for the motor drive assembly shown in FIG. 9.
Figure 11:
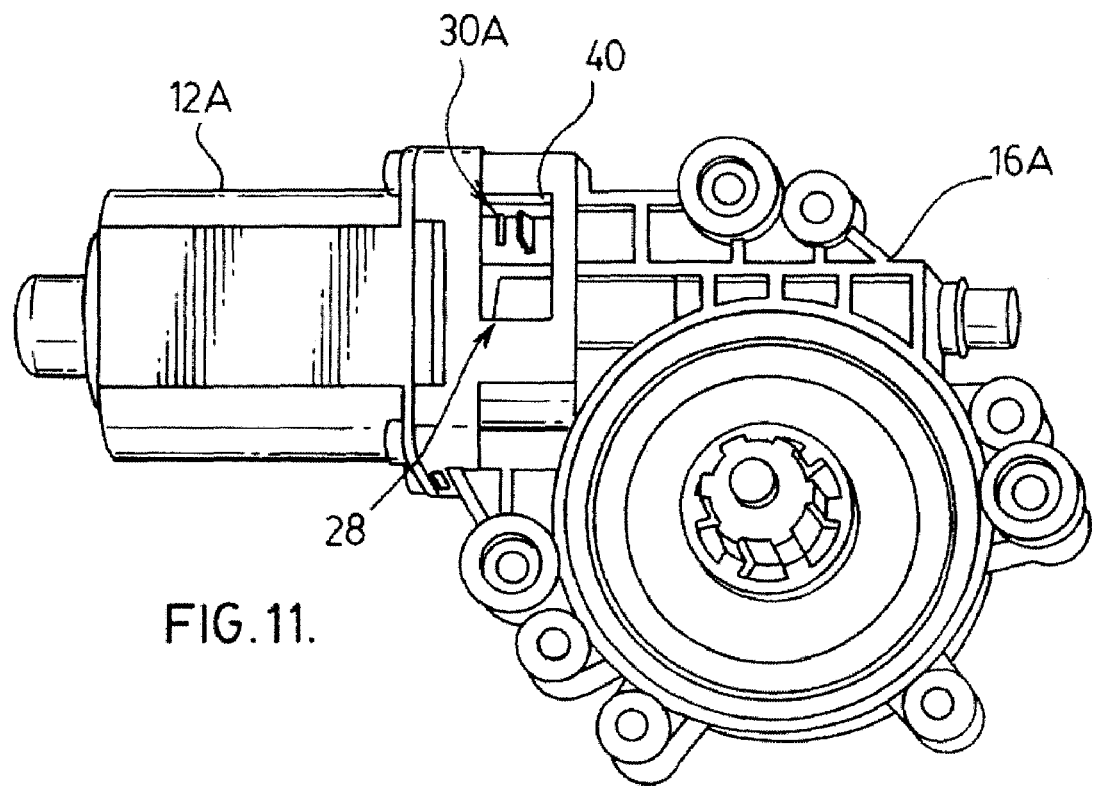
FIG. 11 is a perspective view of a motor and housing for the motor drive assembly shown in FIG. 9.
Figure 12:
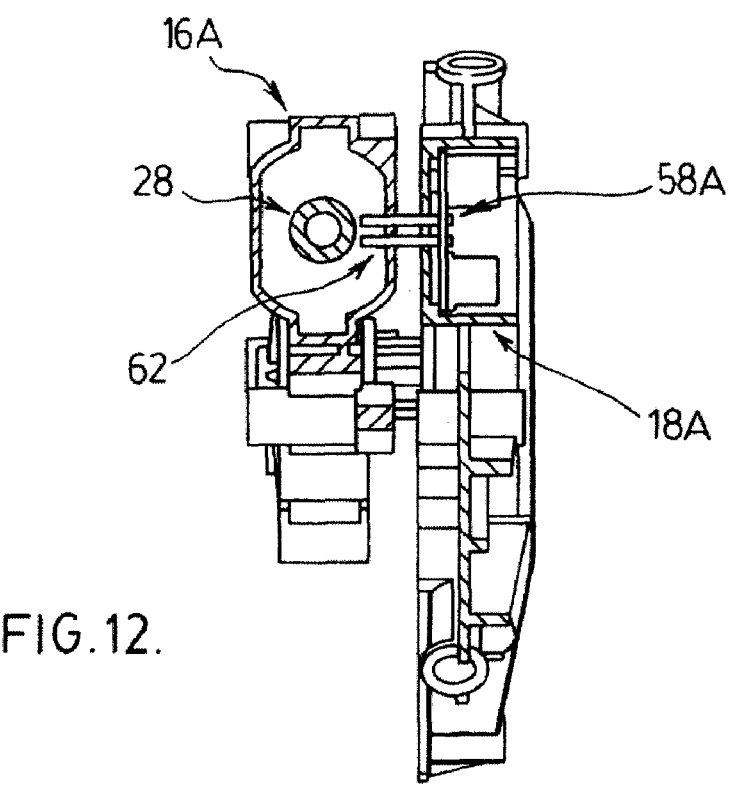
FIG. 12 is a cross-sectional view of the motor drive assembly shown in FIG. 9.

A rectangular window aperture 40 (FIG. 3) is located on housing 16 facing towards interior side 34 providing communication into motor chamber 14. A rectangular projection 42 extends away from the interior side 34 on drum housing 18 towards motor chamber 14 and is sized to provide a clearance fit against the edges 44 of window aperture 40. A pair of slots 46 are provided within drum housing 18 located on or proximate projection 42, and a pair of motor contacts 47 are mounted therein (FIG. 8). When projection 42 is inserted into window aperture 40 motor contacts 30 mate with motor contacts 47. A rubberized seal 48 is mounted around the base of projection 42. When projection 42 is inserted into window aperture 40, a shoulder edge 49 abuts against edges 44 to provide a watertight seal against foreign contamination.

Figure 6:
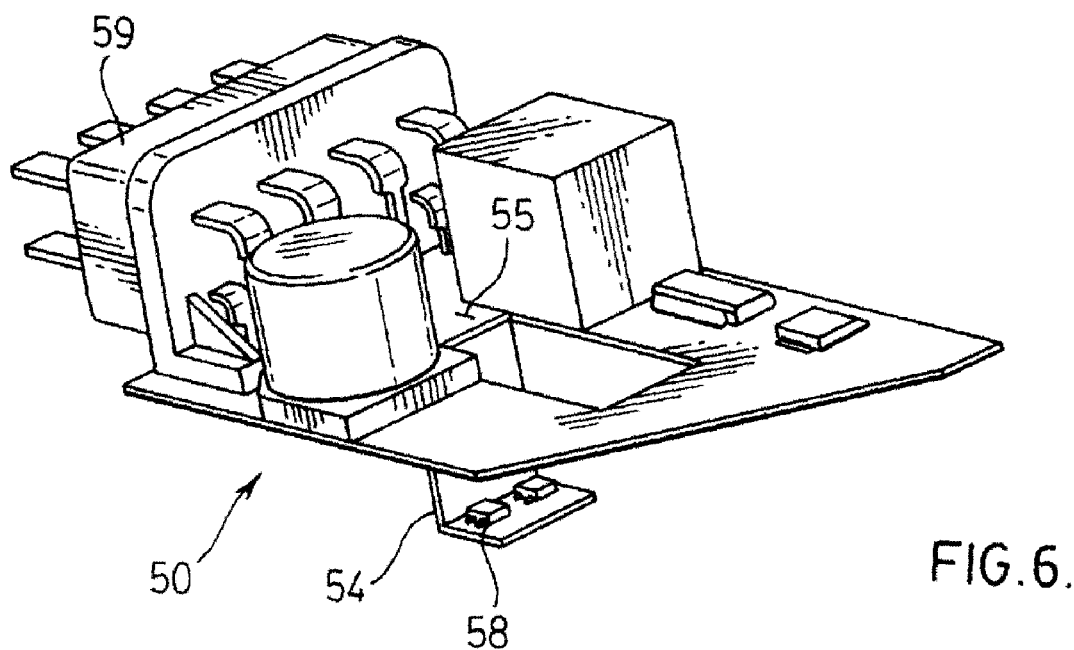
FIG. 6 is a perspective view of an electronic control unit (ECU) for the motor drive assembly shown in FIG. 1'

An electric control unit (ECU) 50 is mounted to the exterior side 36 of drum housing 18 and situated within a board chamber 52 that is located in a plane parallel to that of DC motor 12. ECU 50 provides the logic circuits that controls the speed and direction of DC motor 12 as well as provide power to the motor. ECU 50 is a flexible printed circuit board (PCB), such as Palflex™, manufactured by Parlex Corporation (One Parlex Place, Methuen, Mass. 01844), but other flexible PCBs will occur to those of skill in the art. As can best be seen in FIG. 6, ECU 50 includes electrical connectors 55 for motor contacts 47. ECU 50 also includes an insert tab 54 that extends into a hollow 56 on projection 42. A pair of Hall-effect sensors 58 are located near the end of insert tab 54 within hollow 56. Given their proximity to ring magnet 28, Hall-effect sensors 58 are operable to receive magnetic flux indicative of the speed and/or position of armature shaft 26 and to transmit these signals to ECU 50. Thus, ECU 50 is operable to detect pinching conditions and to stop or reverse the direction of DC motor 12. ECU 50 also includes power connectors 59 that are operable to be connected to the vehicle's power supply (not shown).

Referring now to FIGS. 9, 10, 11 and 12, a second embodiment of the invention is shown at 10A. In this embodiment, drum housing 18A has a cut out window 60A that is in communication with a portion of window aperture 40 on housing 16A. Motor 12A includes a pair of motor contacts 30A that include a 90° bend so that the tips are pointing towards ECU 50A and connect with electrical connectors 55A. A pair of flux guides 62 are molded into the drum housing 18A. Flux guides 62 extend in a first direction through window aperture 40 towards ring magnet 28 and extend in a second direction towards ECU 50A. Hall-effect sensors 58A are mounted on the planar ECU 50A adjacent to the ends of flux guides 62. Flux guides 62 draw the magnetic flux from ring magnet 28 towards Hall-effect sensors 58A in order to provide ECU 50A with signals from the motor.

Referring now to FIGS. 13, 14 and 15, a third embodiment of the invention is shown. In this embodiment, optical sensors are used to determine motor speed and direction instead of magnets and Hall-effect sensors. A reflector ring 64 is mounted around armature shaft 26 adjacent aperture window 40. Reflector ring 64 includes a series of high-contrast light and dark striped regions 66 that run along the length of the ring. A LED emitter 68 is mounted to an interior side 70 of ECU 50B directly over reflector ring 64. A pair of receivers 72 are also mounted to interior side 70 on opposing sides of emitter 68. During operation, light from emitter 68 is reflected off the light regions of reflector ring 64 and is received by receivers 72. Using the signals provided by receivers 72, ECU 50B is operable to detect possible pinch conditions. A flexible silicon seal edge 74 is provided on reflector ring 64 that abuts against a flange (not shown) on DC motor 12 to prevent contamination of reflector ring 64. Power to DC motor 12 is provide via motor contacts 30A, as described above.

What is claimed is:

1. A motor drive assembly, comprising:
a motor housing having a gear chamber;
a gear mounted in the gear chamber for rotation about an axis;
an electric motor enclosed in the motor housing, the electric motor having a rotating armature shaft operatively connected to the gear, the armature shaft having a sensor element mounted thereon, wherein the electric motor defines a first plane perpendicular to the axis;
a drum housing having an interior side and an exterior side, the interior side forming a drum chamber in communication with the gear chamber, the drum housing including a cable guide (38) communicating with the drum chamber;
an electronic control unit mounted to the exterior side of the drum housing for controlling energization of the electric motor, the electronic control unit including a printed circuit board (PCB) mounted in a second plane substantially parallel to and overlapping the first plane;
wherein the motor housing includes a first aperture exposing the sensor element and the portion of the drum housing that mounts the electronic control unit includes a second aperture in registration with the first aperture on the motor housing, thereby providing communication between the electronic control unit and the electric motor.

2. The motor drive assembly of claim 1, wherein the electronic control unit and the electric motor both include a pair of power contacts, and one pair of power contacts extends through the first and second apertures to connect to the other pair of power contacts in order to provide power to the electric motor.

3. The motor drive assembly of claim 2, wherein the sensor element is a ring magnet mounted coaxially around the armature shaft on the electric motor and where the ring magnet is located proximate the aperture on the motor housing.

4. The motor drive assembly of claim 3, wherein the drum housing includes a protrusion that extends through the first aperture in the motor housing towards the ring magnet, the protrusion defining the second aperture.

5. The motor drive assembly of claim 4, wherein a seal is provided between the surface of the protrusion and the motor housing to prevent contamination of the electric motor through the aperture in the motor housing.

6. The motor drive assembly of claim 5, wherein the electronic control unit includes a flexible printed circuit board.

7. The motor drive assembly of claim 6, wherein the flexible printed circuit board includes a bent tab that extends into a hollow within the protrusion towards the ring magnet.

8. The motor drive assembly of claim 7, wherein at least one Hall-effect sensor is mounted to the tab, the at least one Hall-effect sensor being operable to determine at least one of the speed and the direction of rotation of the electric motor.

9. The motor drive assembly of claim 3, further including: at least one Hall-effect sensor located on the electronic control unit; at least one flux guide mounted to the drum housing and extending in one direction towards the electronic control unit and in another direction through the first aperture in the motor housing towards the ring magnet so that the at least one Hall-effect sensor is thereby operable to determine at least one of the speed and the direction of rotation of the electric motor.

10. The motor drive assembly of claim 3, further including: a reflector ring having a plurality of contrasting color regions mounted coaxially over the armature shaft and located proximate the first aperture in the motor housing; a light emitter mounted to the electronic control unit and operable to radiate light through the aperture in the housing towards the reflector ring; at least one light receiver mounted to the electronic unit operable to receive the reflected light from the reflector ring, so that the electronic control unit is operable to determine at least one of the speed and direction of rotation of the electric motor.

11. The motor drive assembly of claim 10, further including a seal located on an edge of the reflector ring and abutting against a flange on a housing of the electric motor, the seal being operable to reduce contamination of the reflector ring by the electric motor.

12. A motor drive assembly, comprising a mounting structure; an electric motor enclosed in a housing and mounted to the mounting structure on a first plane; an electronic control unit for controlling energization of the electric motor mounted to the mounting structure on a second plane; and wherein the first plane and the second plane are substantially parallel, wherein the structure is a drum housing, wherein an aperture is provided in the housing adjacent a portion of the drum housing that mounts the electronic control unit, wherein the drum housing includes an aperture in communication with the aperture on the housing, thereby providing communication between the electronic control unit and the electric motor, wherein the electronic control unit and the electric motor both include a pair of power contacts, and one pair of power contacts extends through the apertures to connect to the other pair of power contacts in order to provide power to the electric motor, wherein a ring magnet is mounted coaxially around an armature shaft on the electric motor and where the ring magnet is located proximate the aperture on the housing, wherein the drum housing includes a protrusion that extends through the aperture in the housing towards the ring magnet, wherein a seal is provided between the surface of the protrusion and the housing to prevent contamination of the electric motor through the aperture in the housing.

13. A motor drive assembly, comprising a mounting structure; an electric motor enclosed in a housing and mounted to the mounting structure on a first plane; an electronic control unit for controlling energization of the electric motor mounted to the mounting structure on a second plane; and wherein the first plane and the second plane are substantially parallel, wherein the structure is a drum housing, wherein an aperture is provided in the housing adjacent a portion of the drum housing that mounts the electronic control unit, wherein the drum housing includes an aperture in communication with the aperture on the housing, thereby providing communication between the electronic control unit and the electric motor, wherein the electronic control unit and the electric motor both include a pair of power contacts, and one pair of power contacts extends through the apertures to connect to the other pair of power contacts in order to provide power to the electric motor wherein a ring magnet is mounted coaxially around an armature shaft on the electric motor and where the ring magnet is located proximate the aperture on the housing, wherein the motor drive assembly further comprises at least one Hall-effect sensor located on the electronic control unit; at least one flux guide mounted to the drum housing and extending in one direction towards the electronic control unit and in another direction through the aperture in the housing towards the ring magnet so that the at least one Hall-effect sensor is thereby operable to determine at least one of the speed and the direction of rotation of the electric motor.

* * * * *